Figure 1:
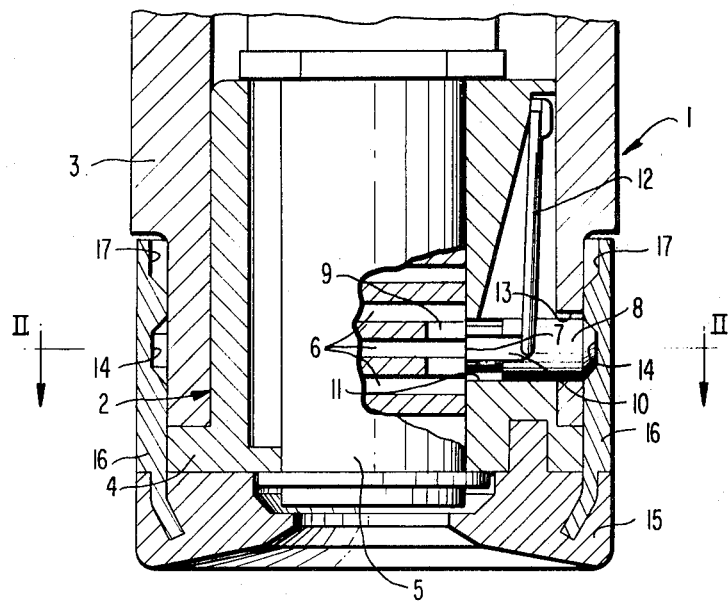

United States Patent [19]
Schiesterl

[11] 3,722,243
[45] Mar. 27, 1973

[54] STEERING LOCK FOR MOTOR VEHICLES

[75] Inventor: Gerhard Schiesterl, Stuttgart, Germany

[73] Assignee: Daimler-Benz Aktiengesellschaft, Stuttgart-Unterturkheim, Germany

[22] Filed: Nov. 1, 1971

[21] Appl. No.: 194,235

[30] Foreign Application Priority Data

Nov. 2, 1970  Germany....................P 20 53 775.1

[52] U.S. Cl. ..........................70/369, 70/377, 70/417
[51] Int. Cl. ......................E05b 15/16, E05b 29/02
[58] Field of Search........70/252, 367, 368, 369, 373, 70/374, 377, 417, 376, 378

[56] References Cited

UNITED STATES PATENTS

| 1,714,424 | 5/1929 | Jacobi | 70/373 |
| 2,097,188 | 10/1937 | Jacobi | 70/417 |
| 3,455,125 | 7/1969 | Da Silva | 70/186 |
| 3,530,697 | 9/1970 | Warnod | 70/252 |

FOREIGN PATENTS OR APPLICATIONS

| 1,808,633 | 6/1970 | Germany | 70/367 |

*Primary Examiner*—Robert L. Wolfe
*Attorney*—Craig, Antonelli & Hill

[57] ABSTRACT

A steering lock for motor vehicles consisting essentially of a steering lock housing, a lock cylinder, a rotor with plate tumblers, a cover cap with a cylindrical extension and a locking pin forced outwardly by a spring and extending through the steering lock housing, which engages in a groove provided in the extension of the cover cap; this extension is thereby made from a material of high strength and an immersion aperture is provided at the end face of at least one plate tumbler, into which the locking pin can be inserted in such a manner that it also simultaneously overlaps over at least one plate tumbler.

12 Claims, 4 Drawing Figures

STEERING LOCK FOR MOTOR VEHICLES

The present invention relates to a steering lock for motor vehicles, essentially consisting of a steering lock housing, a lock cylinder, a rotor with plate tumblers, a cover cap with a cylindrical extension and a locking pin forced outwardly by a spring and extending through the steering lock housing, which engages in a groove provided in the extension of the cover cap.

Steering locks, in which a locking of the steering system takes place when pulling out the ignition key in a predetermined position of the ignition lock and of the steering spindle, are only inadequately secured against a forcible removal or dismantling of the locking mechanism.

In order to prevent an unlocking of the steering by a forcible removal or dismantling of the locking mechanism and therewith prevent an unlawful use of the motor vehicle, the present invention is concerned with the task to provide a steering lock mechanism which eliminates the aforementioned shortcomings.

The underlying problems are solved according to the present invention in that the extension of the cover cap consists of a material with high rigidity and strength and that for the disassembly of the steering lock an immersion or plunger opening is provided within the area at the end face of at least one plate tumbler, into which the locking pin can be inserted with simultaneous overlap over at least one plate tumbler.

In a preferred embodiment of the present invention the center longitudinal axis of the locking pin may be disposed in the plane of a plate tumbler whereby the locking pin is provided with a slot facing the rotor and disposed along a diameter, with the width of the slot being larger than the thickness of the plate tumbler, and whereby parallel to the slot at the circumference of the locking pin the latter is provided with one recess each for purposes of extending over and overlapping several plate tumblers.

In an advantageous construction of the present invention the spring may be constructed of a wire rod which is bent off at an end facing the locking pin.

According to a further feature of the present invention a recess or aperture may be arranged at the end face of the cylindrical extension of the cover cap.

Accordingly, it is an object of the present invention to provide a steering lock for motor vehicles which avoids by simple means the aforementioned shortcomings and drawbacks encountered in the prior art.

Another object of the present invention resides in a steering lock for motor vehicles which assures improved safety against a breaking by force of the lock.

A further object of the present invention resides in a steering lock for motor vehicles which improves the safety against forcible unlocking and/or removal.

Figure 2:
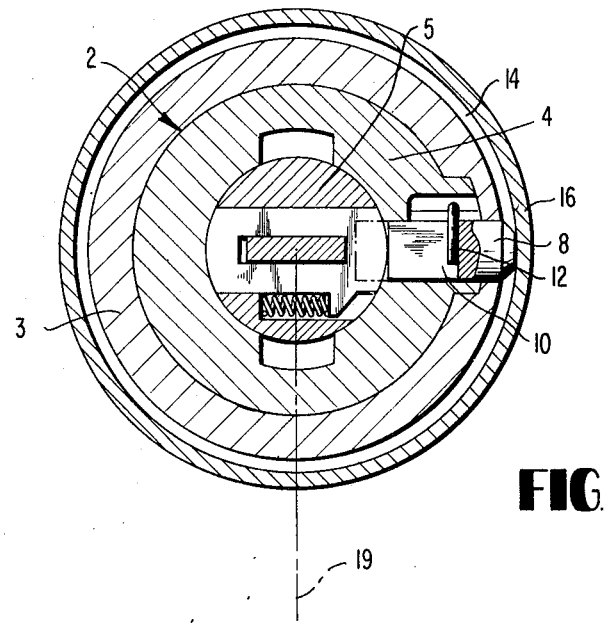
Figure 3:
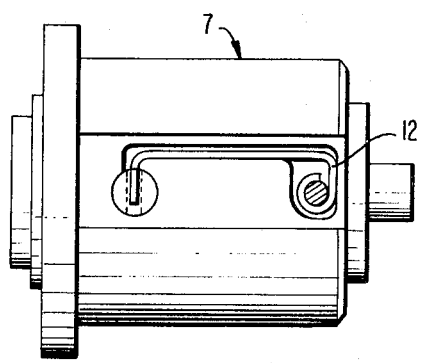
Figure 4:
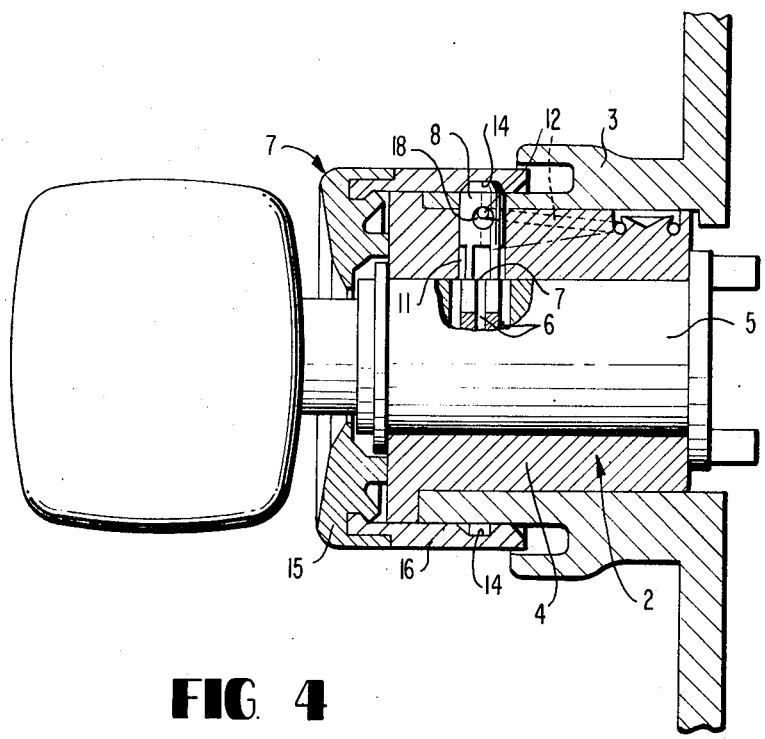

These and further objects, features and advantages of the present invention will become more apparent from the following description when taken in connection with the accompanying drawing which shows, for purposes of illustration only, two embodiments in accordance with the present invention, and wherein:

FIG. 1 is a longitudinal axial cross sectional view through a steering lock in accordance with the present invention, FIG. 2 is a cross sectional view of the steering lock of FIG. 1, taken along line II—II of FIG. 1, FIG. 3 is an elevational view of a lock cylinder with a spring constructed as wire rod, and FIG. 4 is a longitudinal axial cross sectional view through a modified embodiment of a steering lock in accordance with the present invention with the ignition key inserted into the same.

Referring now to the drawings wherein like reference numerals are used throughout the various views to designate like parts, and more particularly to FIG. 1, a steering lock generally designated by reference numeral 1 is provided with a lock cylinder generally designated by reference numeral 2 which is non-rotatably arranged in a steering lock housing 3 and consists of a fixed part, i.e., the stator 4 and of a part movable therein in the circumferential direction, i.e., the rotor 5. The rotor 5 provided with several conventional plate tumblers 6 is provided in proximity to the key insertion opening within the area of an end face 7 (FIG. 1) of the plate tumblers 6 with an immersion or plunger aperture 9 provided for a springily supported locking pin 8, which immersion or plunger aperture 9 is so dimensioned in its size that the locking pin 8, which is provided with a slot 10 disposed along the diameter and with an aperture 11 parallel to the slot 10 and disposed at the circumference of the locking pin 8, can be pushed in and thereby simultaneously overlaps three plate tumblers 6.

An end of a spring 12 formed of wire rod, which is bent approximately at a right angle, is disposed in the slot 10 as can be seen more clearly from FIGS. 2 and 3. The spring 12 extending over the longitudinal side of the stator 4 is secured at the stator by riveting and forces the locking pin 8 radially outwardly whereby the locking pin 8 extends through an aperture 13 (FIG. 1) in the steering lock housing 4 and engages in a groove 14 of a cover cap 15 whose cylindrical extension 16 consists of a material having high strength and is provided at the end face with a recess 17.

In lieu of a recess 17, the cylindrical extension 16 of the cover cap 15 may also be constructed shorter in length and the steering lock housing 3 may be constructed correspondingly longer in such a manner that the steering lock housing 3 extends collar-like over the end face of the extension 16 as shown in FIG. 4. The end of the spring 12 no longer engages in a slot of the locking spring 12 but instead in a bore 18 separate from the slot.

The disassembly of the steering lock takes place according to FIG. 2 as follows:

The ignition key which has been inserted into the lock cylinder, is disposed in the accessory position. Only in this position can the cover cap 15 be pulled off partially whereby the locking pin 8 is forced out of the groove 14 of the cylindrical extension 16 of the cover cap 15 and is inserted into the immersion aperture 9 of the rotor 5. The locking of the rotor 5 is eliminated only when the recess 17 which is arranged at the end side of the extension 16 of the cover cap 15, is disposed over the locking pin 8 and the latter is forced by the prestress of the spring 12 into the recess 17. The ignition key can now be rotated into the position "stop" indicated in FIG. 2 in dash-and-dot line 19. This position then enables the pulling out of the ignition key and the pulling off and removal of the cover cap 15.

While I have shown and described only two embodiments in accordance with the present invention, it is understood that the same is not limited thereto but is susceptible of numerous changes and modifications as are known to those skilled in the art and I therefore do not wish to be limited to the details shown and described herein but intend to cover all such changes and modifications as are encompassed by the scope of the appended claims.

What I claim is:

1. A steering lock for motor vehicles, which includes a steering lock housing means, a steering lock cylinder means, a rotor with plate tumbler means, a cover cap with an extension and a locking pin extending through the steering lock housing means and forced outwardly by a spring means, with the locking pin means engaging in a groove in the extension of the cover cap means, characterized in that the extension of the cover cap means consists of a material with high strength and that for the disassembly of the steering lock, an immersion aperture is provided within the area at the end face of at least one plate tumbler means, into which the locking pin can be inserted with simultaneous overlapping over at least one plate tumbler means.

2. A steering lock according to claim 1, characterized in that the center longitudinal axis of the locking pin is disposed in the plane of a plate tumbler means.

3. A steering lock according to claim 2, characterized in that the locking pin is provided with a slot facing the rotor and disposed on a diameter, whose width is larger than the thickness of the plate tumbler means, and is further provided with recess means parallel to the slot and at the circumference of the locking pin for overlapping several plate tumbler means.

4. A steering lock according to claim 3, characterized in that the spring means is formed of a wire rod which is bent off at the end facing the locking pin.

5. A steering lock according to claim 4, characterized by a recess provided in the end face of the cylindrical extension of the cover cap.

6. A steering lock according to claim 4, characterized in that a recess is effectively formed by a collar-like extension of the housing means, into which the extension of the cover cap is adapted to be inserted in the assembled condition thereof.

7. A steering lock according to claim 4, characterized in that the extension of said cap is substantially cylindrical.

8. A steering lock according to claim 1, characterized in that the locking pin is provided with a slot facing the rotor and disposed on a diameter, whose width is larger than the thickness of the plate tumbler means, and is further provided with recess means parallel to the slot and at the circumference of the locking pin for overlapping several plate tumbler means.

9. A steering lock according to claim 1, characterized in that the spring means is formed of a wire rod which is bent off at the end facing the locking pin.

10. A steering lock according to claim 1, characterized by a recess provided in the end face of the cylindrical extension of the cover cap.

11. A steering lock according to claim 1, characterized in that a recess is effectively formed by a collar-like extension of the housing means, into which the extension of the cover cap is adapted to be inserted in the assembled condition thereof.

12. A steering lock according to claim 1, characterized in that the extension of said cap is substantially cylindrical.

* * * * *